(12) United States Patent
White et al.

(10) Patent No.: US 10,001,207 B1
(45) Date of Patent: Jun. 19, 2018

(54) TERTIARY CHAIN LACING ASSEMBLY

(71) Applicant: BorgWarner Inc., Auburn Hills, NY (US)

(72) Inventors: Timothy K. White, Sterling Heights, MI (US); Robert Mario Mariuz, Penfield, NY (US); Bruce Alan Churchill, Groton, NY (US)

(73) Assignee: BorgWarner Inc., Auburn Hills, NY (US)

( * ) Notice: Subject to any disclaimer, the term of this patent is extended or adjusted under 35 U.S.C. 154(b) by 0 days. days.

(21) Appl. No.: 15/722,387

(22) Filed: Oct. 2, 2017

(51) Int. Cl.
| | | |
|---|---|---|
| *F16G 13/02* | (2006.01) | |
| *F16H 57/00* | (2012.01) | |
| *F16H 9/24* | (2006.01) | |
| *F16G 5/18* | (2006.01) | |
| *B21L 9/06* | (2006.01) | |

(52) U.S. Cl.
CPC .......... *F16H 57/0006* (2013.01); *F16G 5/18* (2013.01); *F16H 9/24* (2013.01); *B21L 9/065* (2013.01)

(58) Field of Classification Search
CPC . F16G 13/04; F16G 13/06; F16G 5/18; F16H 9/24; B21L 9/065
USPC ..................... 59/35.1, 78; 474/212, 213, 228
See application file for complete search history.

(56) References Cited

U.S. PATENT DOCUMENTS

| | | | |
|---|---|---|---|
| 4,342,560 A | | 8/1982 | Ledvina et al. |
| 4,509,937 A | * | 4/1985 | Ledvina .................. F16G 13/04 474/213 |
| 5,147,251 A | | 9/1992 | Cole, Jr. |
| 6,663,522 B2 | | 12/2003 | Horie |
| 6,685,589 B2 | * | 2/2004 | Horie ...................... F16G 13/04 474/212 |
| 7,500,928 B2 | * | 3/2009 | Hummel ................ F16G 13/06 474/228 |
| 2004/0166978 A1 | | 8/2004 | Matsuda et al. |
| 2006/0160648 A1 | | 7/2006 | Hummel et al. |
| 2010/0210387 A1 | | 8/2010 | Sakamoto |
| 2010/0311530 A1 | | 12/2010 | Ledvina et al. |

FOREIGN PATENT DOCUMENTS

| | | |
|---|---|---|
| WO | 2017032372 A1 | 3/2017 |
| WO | 2017045156 A1 | 3/2017 |

\* cited by examiner

*Primary Examiner* — David B Jones
(74) *Attorney, Agent, or Firm* — Brown & Michaels, PC

(57) ABSTRACT

A random pattern chain assembly of the present invention improves noise, vibration and harshness (NVH) performance of a silent or inverted tooth chain. The chain assembly preferably uses at least three different link types arranged in a known pattern. The pattern is arranged such that the first link type is never adjacent the third link type, in that there is always a second link type between the first link type and the third link type.

10 Claims, 2 Drawing Sheets

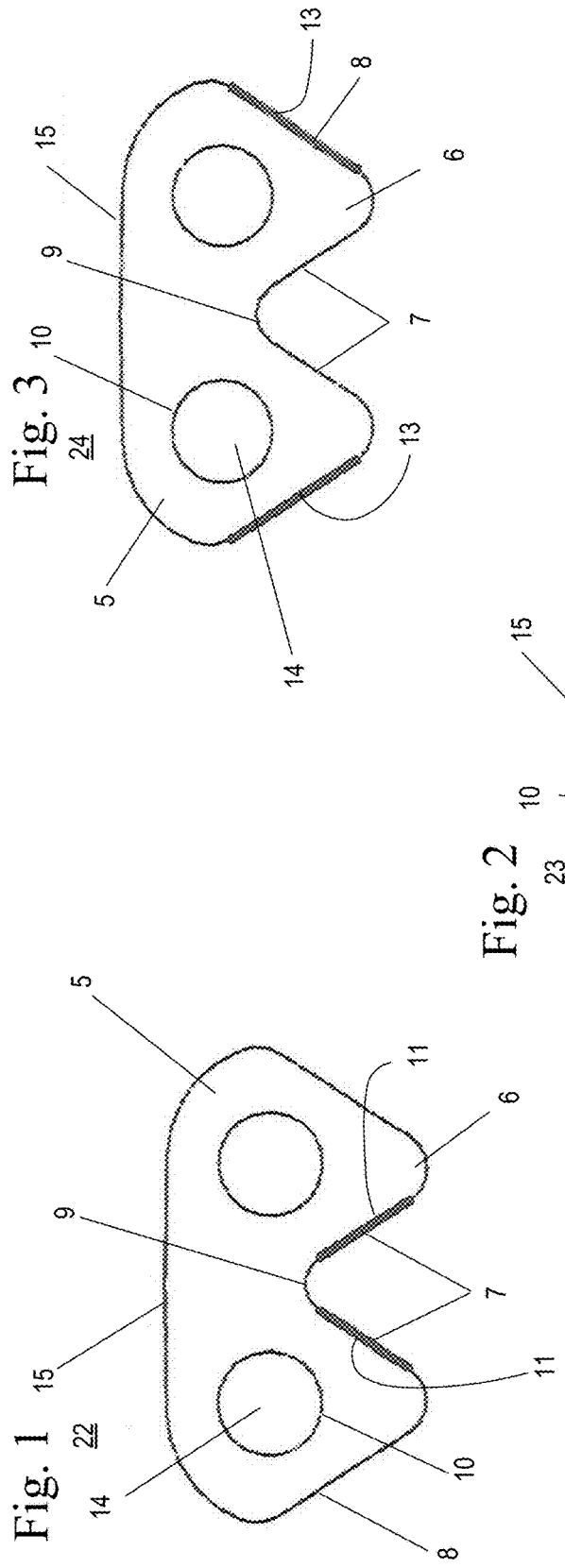

Fig. 4

| Pitch Number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| 1st Link Type | | | | | X | | | | | | | | | | X | | | | | | | | | | |
| 2nd Link Type | | | | X | | X | | | | | | | | | | X | | | | | X | | | | |
| 3rd Link Type | X | X | | | | | X | X | X | X | X | X | X | X | | | X | X | X | X | | X | X | X | X |

| Pitch Number | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
|---|---|---|---|---|---|---|---|---|---|---|---|---|---|---|---|---|---|---|---|---|---|---|---|---|---|
| 1st Link Type | X | | X | | | | | | | | | | | | | | | | | | | | | | |
| 2nd Link Type | | X | | | | | | | | | X | | | | | | | | | | X | | | | |
| 3rd Link Type | | | | X | X | X | X | X | X | X | | X | X | X | X | X | X | X | X | X | | X | X | X | X |

| Pitch Number | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 |
|---|---|---|---|---|---|---|---|---|---|---|---|---|---|---|---|---|---|---|---|---|---|---|---|---|---|
| 1st Link Type | X | | | | | | | | X | | | | | | | | | | X | | | | | | |
| 2nd Link Type | | | X | | | | | X | | X | | | | | | X | X | | | | | | | | |
| 3rd Link Type | | X | | X | X | X | X | | | | X | X | X | X | X | | | X | | X | X | X | X | X | X |

| Pitch Number | 76 | 77 | 78 | 79 | 80 | 81 | 82 | 83 | 84 | 85 | 86 | 87 | 88 | 89 | 90 | 91 | 92 | 93 | 94 | 95 | 96 | 97 | 98 | 99 | 100 |
|---|---|---|---|---|---|---|---|---|---|---|---|---|---|---|---|---|---|---|---|---|---|---|---|---|---|
| 1st Link Type | X | | | | | | | | | | | | | X | | | | | | | | | | | |
| 2nd Link Type | | X | | X | | | | X | | | | | | | | | | X | | | X | | | X | |
| 3rd Link Type | | | X | | X | X | X | | X | X | X | X | X | | X | X | X | X | X | X | | X | X | | X |

TERTIARY CHAIN LACING ASSEMBLY

BACKGROUND OF THE INVENTION

Field of the Invention

The invention pertains to the field of chains. More particularly, the invention pertains to chain lacing of a random pattern silent or inverted chain assembly.

Description of Related Art

Chain lacing of only one type of link for a silent or inverted toothed chain has a constant pitch frequency which results in high noise vibration and harshness (NVH), which can be unsatisfactory for a user of an engine with such a chain. To reduce the NVH levels of the chain engagements, prior methods involved the use of a chain with links with two different profiles that are used to disrupt the pattern of the pitch engagement. This technique gives the noise characteristic which sounds random as it is difficult to discern the pure pitch tone of the chain engaging the sprocket.

SUMMARY OF THE INVENTION

A random pattern chain assembly of the present invention improves noise, vibration and harshness (NVH) performance of a silent or inverted tooth chain. Traditionally the random pattern was created using only two link patterns however, in order to increase the ability to tune the NVH of the chain, there is a benefit to using a chain with three or more link profiles. The chain assembly preferably uses at least three different link types arranged in a known pattern. The pattern is arranged such that the first link type is never adjacent the third link type, in that there is always a second link type between the first link type and the third link type.

BRIEF DESCRIPTION OF THE DRAWING

FIG. 1 shows a schematic of a first link type.
FIG. 2 shows a schematic of a second link type.
FIG. 3 shows a schematic of a third link type.
FIG. 4 shows an example of tertiary lacing pattern using the first link type, second link type and third link type of FIGS. 1-3.

DETAILED DESCRIPTION OF THE INVENTION

FIGS. 1-3 show three different link types 22, 23, 24 which make up a random pattern chain assembly of the present invention arranged in a known pattern. The highlighted portions of the link types 22, 23, 24 of FIGS. 1-3, designated as reference numbers 11, 12, and 13 indicate where the sprocket or gear contacts the links when the chain is assembled on at least one driven sprocket and a driving sprocket.

Each of the link types 22, 23, 24 has a body 5 with two teeth 6 extending from the body 5. Each tooth 6 has an inside flank 7 and an outside flank 8. The teeth 6 are separated by a crotch 9. A pair of apertures 10 is also present within the body 5. Opposite the teeth 6 of the link 22, 23, 24 is a back 15. The back can straight, a radius or other feature which is not flat. The link types 22, 23, 24 are arranged together in a pattern and connected via at least one pin 14 received by the apertures 10. The pin 14 may be a single round pin as shown or multiple pins, such as a rocker pin and another pin. The teeth 6 of the links 22, 23, 24 engage with teeth of a sprocket or gear (not shown).

Each of the link types 22, 23, 24 consists of a unique geometric profile and the differences between the profiles create a unique link to sprocket engagement for each link type. The link may have a contact point which first engages on the inside flank 7 of the link, on the outer flank 8 of the link of a combination where the link first engages on the inside flank 7 of the link and then transitions to a contact point on the outer side of the link, for example the outer flank 8. For example, the second link type 23 provides less difference in engagement when compared to the first link type 22 and the third link type 24 than when comparing the engagement of the first link type 22 and the third link type 24 with the teeth of the sprocket. Longitudinally adjacent and on the outside of the lacing of the links are outer guide links (not shown).

The pattern of the assembled chain is longitudinally arranged such that the first link type 22 is never adjacent the third link type 24, in that there is always a second link type 23 between the first link type 22 and the third link type 24. Therefore, the first link type 22 and the third link type 24 can never be adjacent to one another and that at least one second link type 23 must be between the first link type 22 and the third link type 24. By having the second link type 23 between the first link type 22 and the third link type 24, a greater range of engagement types is achieved while reducing differences between adjacent link engagement types in the chain lacing pattern. The range of engagement is the difference between an inside flank only contact link and an outer flank contact link. In having a second link type, the link type serves as an intermediate link type to provide a more gradual transition between link engagement styles when moving from the first link type to the third link type.

The first link type 22, as shown in FIG. 1, contacts the sprocket or gear on the inside flank 7 only or as transitional contact from the inside flank 7 to the outside flank 8 as indicated by the highlighted portion 11. In other words, contact with the sprocket teeth with the inside flank transitions to contact of an outside flank of a longitudinally adjacent link.

The second link type 23, as shown in FIG. 2, contacts the inside flank 7 only or as transitional contact from the inside flank 8 to the outside flank 8, or the outside flank 8 only as shown by the highlighted portions 11, 12 such that engagement is changed from the first link type 22.

The third link type 24, as shown in FIG. 3, contacts the inside flank 7 only, transitional contact from the inside flank 7 or the outside flank 8 or the outside flank only 8 as shown by the highlighted portion 13, such that the engagement is changed from the first link type 22 and the second link type 24.

By using unique link geometries within a chain assembly using a known random pattern, the pitch frequency can be altered to a lower level. This is accomplished by the two unique engagements created by the three link types. The use of the unique link types arranged in a random pattern for a chain can create unwanted vibrations within the chain strands if the difference between the link engagement types is large enough. The use of the three link types 22, 23, 24 allows for a large difference in engagement between the first link type 22 and the third link type 24 while reducing the unwanted vibrations by using at least one second link type 23 between the first link type 22 and the third link type 24. The second link type's 23 engagement characteristics are between the first link type 22 and the third link type 24.

FIG. 4 shows an example of tertiary lacing pattern using the first link type 22, second link type 23 and third link type 24 of FIGS. 1-3. As shown in FIG. 4, the incremental number corresponds to the pitch number position of the chain. Therefore in FIG. 4, the chain lacing pattern shown has 98 links with each pitch number corresponding to a specific link in the lacing of the assembled chain assembly. In the lacing pattern, the first link type 22 is never adjacent the third link type 24. Between the first link type 22 and the third link type 24 is a second link type 23. While not shown, outer guide links may be present adjacent the first link type 22 or third link type links 24.

In an alternate embodiment, the number of unique links can increased from three to four links or more. The additional at least one unique link type can be used to change the lacing pattern, such that there are more lacing patterns available, increasing the transition between link types. The contact locations of the links with the teeth of the gear or sprocket for each of the link types could be inside flank only (e.g. first link type), transitional with both inside and outside flanks contacting (e.g. second link type) or outside flank only (e.g. third link type). There could be any combination of these link engagements types in a chain and not all engagement types are required in each chain. For example, one or more transitional links (e.g. second link types) may be present between the inside flank only link (first link type) and the outside flank only links (third link type).

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A random pattern silent or inverted tooth chain assembly for engagement with teeth of a sprocket or a gear, the chain assembly comprising:
    a first link type, a second link type and a third link type, each of the link types comprising a body defining a first profile, the body having: a pair of teeth, each tooth having an inner flank and an outer flank, the inner flanks of the teeth connected through a crotch; and a pair of apertures for receiving pins;
    wherein when the chain is assembled, the first link type engages the teeth of sprocket or the gear on the inside link and transferred contact of the teeth of the sprocket or the gear from the inside flank of the first link type to an outside flank or inside flank of a longitudinally adjacent link of the chain assembly; the second link type engages the teeth of sprocket or the gear on the inside link or the outside flank and transfers contact of the teeth of the sprocket or the gear from the inside flank or the outside flank of the second link type to an outside flank of a longitudinally adjacent link of the chain assembly; and the third link type engages the teeth of sprocket or the gear on the outside flank and transfers contact of the teeth of the sprocket or the gear from the outside flank to the inside flank of a longitudinally adjacent link of the chain assembly;
    wherein the second link type is longitudinally adjacent the first link type and the third link type, such that the third type link is not longitudinally adjacent the first type link.

2. The chain assembly of claim 1, further comprising outer guide links longitudinally adjacent the first link type and the third link type.

3. The chain assembly of claim 1, further comprising at least two second link types between the first link type and the third link type.

4. The chain assembly of claim 1, wherein the pins are single round pins.

5. The chain assembly of claim 1, wherein the pins are a rocker pin and another pin.

6. A method of lacing a silent chain assembly for engagement with teeth of a sprocket or a gear comprising a first link type, a second link type and a third link type, each of the link types comprising a body having a pair of teeth, each tooth having an inner flank and an outer flank, the inner flanks of the teeth connected through a crotch; and a pair of apertures for receiving pins, the method comprising the steps of:
    a) placing a first link type or third link type on a pin through the pair of apertures; and
    b) placing a second link type longitudinally adjacent on the pin through the apertures adjacent the first link type or the third link type;
    repeating steps a) and b) for a desired width;
    wherein the second link type is longitudinally adjacent the first link type and the third link type, such that the third type link is not longitudinally adjacent the first type link.

7. The method of claim 1, wherein prior to step a), an outer guide link is placed on the pin and after the chain is the desired width another outer guide link is placed on the pin.

8. The method of claim 1, wherein the first link type engages teeth of the sprocket or the gear on the inside flank and transitions contact from teeth of the sprocket or the gear on the inside flank to an outside flank of a longitudinally adjacent link.

9. The method of claim 1, wherein the second link type engages teeth of the sprocket or the gear on the inside flank or the outside flank and transitions contact of the teeth or the sprocket or the gear on the inside flank to an outside flank of a longitudinally adjacent link.

10. The method of claim 1, wherein the third link type engages teeth of the sprocket or the gear on the outside flank and transitions contact of the teeth or the sprocket or the gear on the outside flank to an inside flank of a longitudinally adjacent flank.

* * * * *